(12) United States Patent
Schatz

(10) Patent No.: US 7,441,891 B2
(45) Date of Patent: Oct. 28, 2008

(54) EYEGLASS RETAINER

(76) Inventor: Blaine Schatz, 1019 N. 5th St., Bismarck, ND (US) 58501

( * ) Notice: Subject to any disclaimer, the term of this patent is extended or adjusted under 35 U.S.C. 154(b) by 193 days.

(21) Appl. No.: 11/646,652

(22) Filed: Dec. 28, 2006

(65) Prior Publication Data
US 2008/0158505 A1  Jul. 3, 2008

(51) Int. Cl.
*G02C 5/14* (2006.01)
(52) U.S. Cl. ........................ 351/123; 351/121
(58) Field of Classification Search ............... 351/111, 351/119, 121, 123
See application file for complete search history.

(56) References Cited

U.S. PATENT DOCUMENTS

| | | | |
|---|---|---|---|
| 2,626,538 A | 1/1953 | Frum | |
| 3,612,669 A | * 10/1971 | Vinson | ............ 351/113 |
| 3,701,591 A | 10/1972 | Wichers | |
| 3,957,361 A | 5/1976 | Buccicone | |
| 4,204,749 A | 5/1980 | Davis | |
| 4,657,364 A | 4/1987 | Murrell | |
| 4,696,556 A | 9/1987 | Perry, III | |
| 4,730,916 A | 3/1988 | Liautaud | |
| 5,074,656 A | 12/1991 | Parrish | |
| 5,120,119 A | * 6/1992 | Mats | ............ 351/157 |
| 5,181,052 A | 1/1993 | McClellan | |
| RE34,836 E | 1/1995 | Murrell | |
| 5,575,042 A | 11/1996 | Kalbach | |
| 6,182,334 B1 | 2/2001 | Davancens | |
| 6,450,640 B1 | 9/2002 | Van Rysselberghe | |
| 6,478,419 B1 | 11/2002 | McDaniel | |
| 6,644,806 B2 | 11/2003 | Wu | |
| 6,758,562 B1 | 7/2004 | Barnette | |

* cited by examiner

*Primary Examiner*—Huy K Mai

(57) ABSTRACT

An eyeglass retainer for attaching to an eyeglass frame having a temple. The eyeglass retainer includes a temple arm, a retaining arm, and a spring pivot portion. The temple arm includes an open end and a pivot end. The temple is removably insertable into the open end, and the pivot end is attached to the spring pivot portion. The retaining arm includes a proximate end and an exterior surface. The proximate end is coupled to the spring pivot portion and the exterior surface engages an eyeglass wearer. The spring pivot portion resists relative movement between the temple arm and the retaining arm thereby retaining the eyeglass frame against the eyeglass wearer.

20 Claims, 3 Drawing Sheets

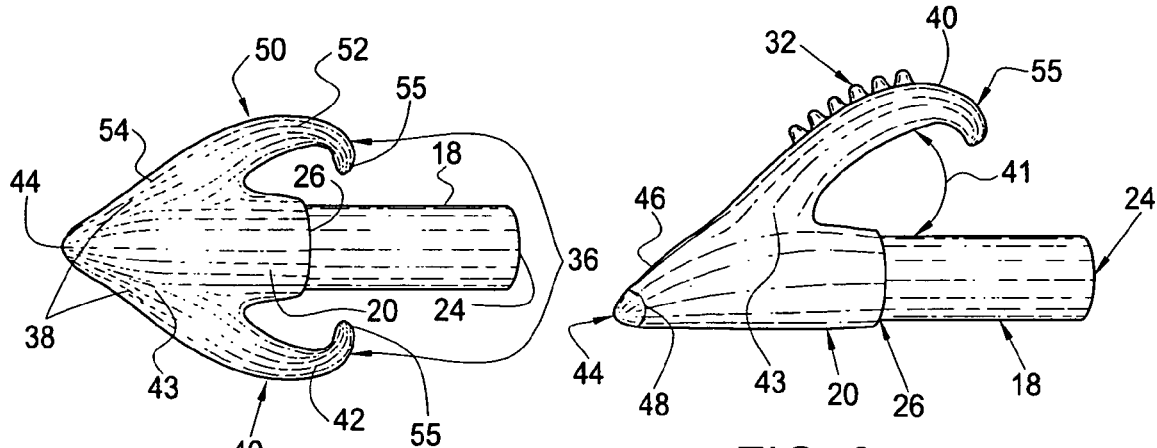
FIG. 7
FIG. 8
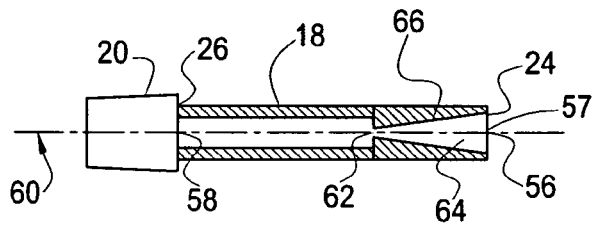
FIG. 9
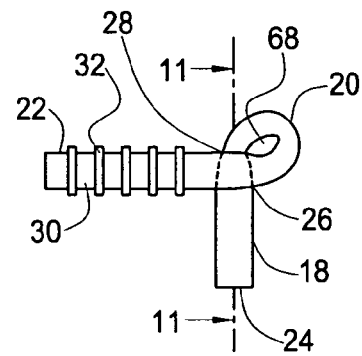
FIG. 10
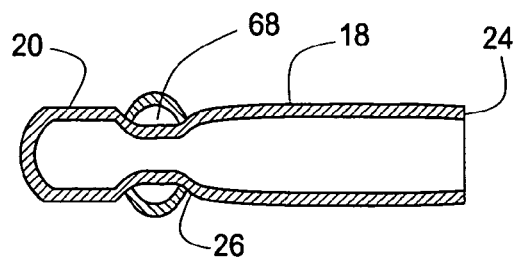
FIG. 11

EYEGLASS RETAINER

BACKGROUND OF THE INVENTION

The present invention relates to retention devices for eyeglass frames. In particular, the present invention relates to eyeglass retainers that attach to a distal end of a temple for engaging an eyeglasses wearer.

For centuries people have worked to solve the problem of securing eyeglasses comfortably on a wearer's head and conveniently securing eyeglasses on a wearer's person when the eyeglasses are not being worn. There is a natural tendency for eyeglasses to slip down the wearer's nose and face, from their optimal location with the lenses positioned in front of the wearer's eyes. The problem is exacerbated when glasses are worn during vigorous activities such as running or cycling, or when the wearer has fluid such as sweat, make-up, or lotion around the eyes and upper part of the nose where glasses typically rest.

Traditional eyeglass frames engage an eyeglasses wearer at a bridge and two temples. The bridge rests on the nose of the eyeglasses wearer and resists downward slipping of the eyeglass frame. The temples rest on the ears of the eyeglasses wearer. Many temples have a distal end that curl around the ear of the eyeglasses wearer in an attempt to resist eyeglass movement or the temples are adjusted to apply pressure to the side of the eyeglasses wearer's head. However, the problem with these eyeglass frames is that they do not sufficiently grip an eyeglasses wearer. The eyeglass frame can bounce when the eyeglasses wearer is active, and the eyeglass frame can fall off when the eyeglasses wearer leans forward.

One technique for securing eyeglass frames to an eyeglasses wearer includes the use of a band, cord, tube, or strap. The band has two ends with each end attached to a temple end on the eyeglass frames. Some bands are short and are worn snugly behind the head of the eyeglasses wearer. The problem with the short bands is that they make it difficult to remove and apply the eyeglass frame from the eyeglasses wearer, and they do not allow the eyeglass frame to be resiliently retained in alternative locations on the person of the eyeglasses wearer. Other bands are long and bulky and allow the eyeglass frame to dangle from the eyeglasses wearer's neck when the eyeglass frames are not in use. The problem with long bands is that they are free to swing around and get in the way of the eyeglasses wearer, as well as get tangled in the hair of the eyeglasses wearer. Another problem of the long bands is that, when the eyeglass wearer bends over and the eyeglass frames are hanging from the band, the eyeglass frames can hit unwanted objects and damage the eyeglass frames and lenses.

Another technique for securing an eyeglass frame to an eyeglasses wearer includes the attachment of a separate eyeglass retainer to each temple. These eyeglass retainers have previously attached to a temple stem, and not an end of the temple, and include the use of a hook mechanism behind the ear to resist forward movement of the temple. In some eyeglass retainers, the hook mechanism engages the ear of the eyeglasses wearer. This causes pressure to be applied behind the ear in a small and highly sensitive area. Other separate eyeglass retainers engage the back of the eyeglasses wearer's head. These eyeglass retainers make application and removal of the eyeglass frames cumbersome and do not allow for one-handed application of the eyeglass frames to the eyeglasses wearer. A further problem with these eyeglass retainers is they do not allow for ready placement of the eyeglass frames on alternative locations of the eyeglasses wearer, such as the eyeglasses wearer's neck.

Another problem with accessory eyeglass retainers that utilize a tube or band is that the tube portions are insufficiently flexible to fit over a wide range of temple dimensions. The thickness and shape of temples vary dramatically. Temples may be small gauge wire extensions with a round cross-section, as in aviator glasses, or they may be large plastic braces. The tube portions of prior accessory retainers such as those mentioned above are not versatile enough to fit on temples that vary over a wide range of cross-sectional dimensions.

As such, it is desirable to provide an eyeglass retainer that can be quickly and easily attached to an eyeglass frame with temples of varying sizes, and which will apply a retaining force to the temples so that when eyeglass frames are on the eyeglasses wearer, the eyeglass retainer creates tension between the eyeglass frame and the eyeglasses wearer such that the eyeglasses resist dislodgement during activity by the eyeglasses wearer.

Further, it is desirable to provide an eyeglass retainer that, when mounted on an eyeglass frame, permits easy application of the eyeglass frames to the person of the eyeglasses wearer, and allows alternative secure placement of the eyeglass frames against the eyeglasses wearer when the eyeglass frame is not engaged with the nose of the eyeglasses wearer.

Even though the problem of securing eyeglass frames has been worked on diligently by many people for many years, a need still exists for a comfortable, flexible, inexpensive, universal eyeglass retainer that allows easy application of the eyeglass frames to the wearer and does not require an around-the-head tensioning strap.

BRIEF SUMMARY OF THE INVENTION

The present invention includes an eyeglass retainer for attaching to an eyeglass frame, the eyeglass retainer includes a temple arm, a retaining arm, and a spring pivot portion. The temple arm has an open end that attaches to a temple and a pivot end that is coupled to the spring pivot portion. The retaining arm includes a proximate end coupled to the spring pivot portion and an exterior surface for engaging an eyeglasses wearer. The spring pivot portion resists relative movement between the temple arm and the retaining arm thereby retaining the eyeglass frame against the eyeglasses wearer.

BRIEF DESCRIPTION OF THE DRAWINGS

FIG. 7 is a side view of a fourth embodiment of the present invention.

FIG. 8 is a bottom view of the fourth embodiment of the present invention.

FIG. 9 is a sectional view of a temple arm of the present invention taken along section 9-9 in FIG. 3.

FIG. 10 is a bottom view of a fifth embodiment of the present invention.

FIG. 11 is a sectional view of the fifth embodiment of the present invention taken along section 11-11 in FIG. 10.

DETAILED DESCRIPTION

Figure 1:
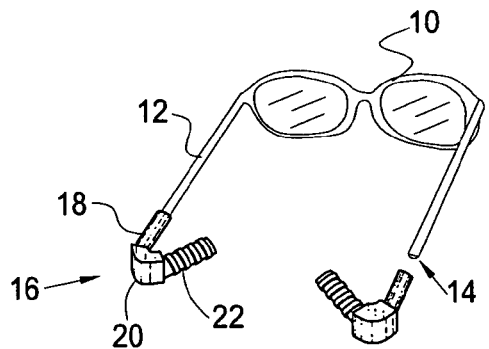
FIG. 1 is a perspective view of an eyeglass retainer of the present invention.

FIG. 1 is a perspective view of eyeglass retainer 16 which is a device for attaching to eyeglass frames 10 for securing eyeglass frames 10 while worn. Eyeglass retainer 16 includes temple arm 18, spring pivot portion 20, and retaining arm 22. Distal end 14 of temple 12 inserts into temple arm 18. A like eyeglass retainer is mounted on temple 12 of eyeglass frames 10 in the same manner. Since eyeglass retainer 16 is of identical construction for both temples, only one will be described in detail.

Figure 2:
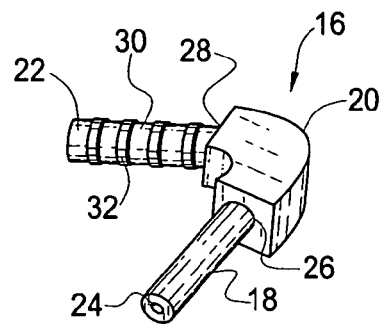
FIG. 2 is a perspective view of a first embodiment of the present invention.

FIG. 2 is a perspective view of an eyeglass retainer 16 of the present invention and further illustrates the components of eyeglass retainer 16. As shown, eyeglass retainer 16 includes open end 24, pivot end 26, proximate end 28, exterior surface 30, and projections 32. Open end 24 is removably attached to distal end 14 of temple 12, and temple arm 18 is attached to spring pivot portion 20 at pivot end 26. Open end 24 comprises a diameter between about 1/32 of an inch and 1/4 of an inch to allow for insertion of a wide range of temple 12 diameters. Retaining arm 22 includes proximate end 28 coupled to spring pivot portion 20 and also includes exterior surface 30 having projections 32.

Spring pivot portion 20 acts as a fulcrum and creates a pivot point about which temple arm 18 and retaining arm 22 bend such that spring pivot portion 20 resists movement between temple arm 18 and retaining arm 22. Spring pivot portion 20 has greater rigidity than temple arm 18 and retaining arm 22 such that pressure applied to temple arm 18 results in temple arm 18 pivoting about pivot end 20. Also, pressure applied to retaining arm 22 results in retaining arm 22 pivoting at proximate end 28 relative to spring pivot portion 20. As such, spring pivot portion 20 resists relative motion between temple arm 18 and retaining arm 22.

Eyeglass retainer 16 is fabricated from an elastomeric material and projections 32 consist of raised surfaces for inhibiting movement between retaining arm 22 and eyeglasses wearer 70. Projections 32 may be raised ridges, fins or saw teeth and resiliently engage eyeglasses wearer 70. Alternatively, exterior surface 30 could be fabricated with dimples 35 instead of projections 32 as a method to inhibit movement between retaining arm 22 and eyeglasses wearer 70.

Figure 3:
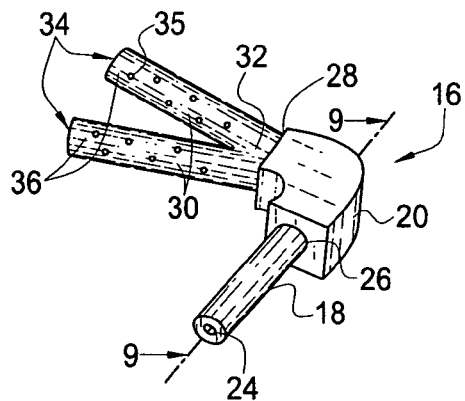
FIG. 3 is a perspective view of a second embodiment of the present invention.

FIG. 3 is a perspective view of an alternative embodiment of eyeglass retainer 16 and includes pair of elongated shafts 34 having spaced apart region 36 and attachment region 38. Spaced apart region 36 converges to attachment region 38 located at proximate end 28. Pair of elongated shafts 34 are shown with dimples 35 on exterior surface 30.

Pair of elongated shafts 34 increase the surface area of exterior surface 30 and provide increased retention of eyeglass frames 10 against eyeglasses wearer 70. Pair of elongated shafts 34 also allows for independent flexion of each respective elongated shaft comprising pair of elongated shafts 34, which in turn increases comfort and wearability by conforming to curves and irregular shapes of eyeglasses wearer 70. Pair of elongated shafts 34 engages eyeglasses wearer 70 in two spaced apart locations per temple 12 and thus further increases resilient retention of eyeglass frames 10 by reducing rocking and bouncing of eyeglass frames 10 and also reducing vertical movement of eyeglass retainer 16 along eyeglasses wearer's 70 head.

Figure 4:
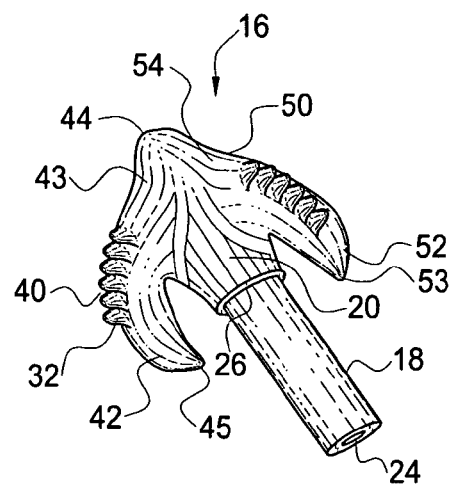
FIG. 4 is a perspective view of a third embodiment of the present invention.
Figure 5:
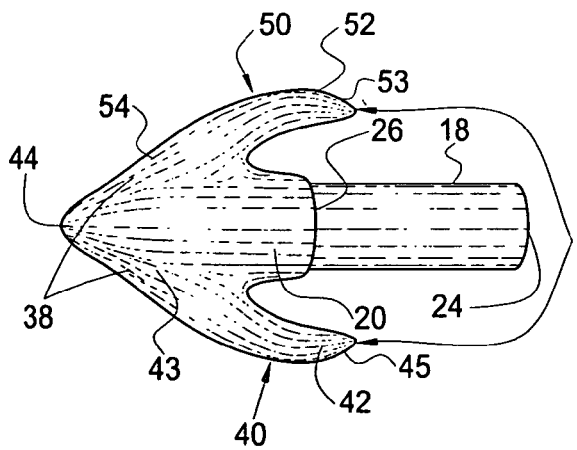
FIG. 5 is a side view of the third embodiment of the present invention.
Figure 6:
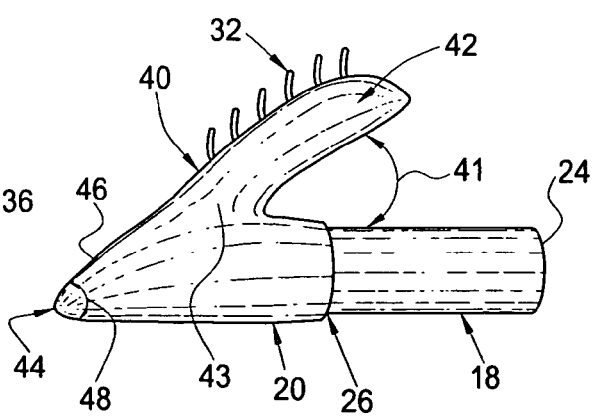
FIG. 6 is a bottom view of a third embodiment of the present invention.

FIGS. 4-6 are views of an alternative embodiment of eyeglass retainer 16. FIG. 4 is a perspective view of eyeglass retainer 16 including first retaining arm 40, second retaining arm 50, and application tip 44. First retaining arm 40 has first proximate end 43 attached to spring pivot portion 20 and further includes first exterior surface 42. Second retaining arm 50 has second proximate end 54 attached to spring pivot portion 20 and further includes second exterior surface 52.

FIG. 5 is a side view of eyeglass retainer 16 of FIG. 4, and illustrates spaced-apart region 36 of first retaining arm 40 and second retaining arm 50 extending from attachment region 38 located at first proximate end 43 and second proximate end 54. First retaining arm 40 and second retaining arm 50 pivot about spring pivot portion at first proximate end 43 and second proximate end 54. Also, first retaining arm 40 includes first retainer tip 45 and second retaining arm 50 includes second retainer tip 53.

FIG. 6 is a bottom view of eyeglass retainer 16 of FIGS. 4 and 5, and illustrates application tip 44. First retaining arm 40 includes first proximate end 42, and first proximate end 42 is attached to spring pivot portion 20 such that engagement angle 41 is created between first retaining arm 40 and temple arm 18. Second retaining arm 50 is substantially aligned with first retaining arm 40 such that second retaining arm 50 also lies along engagement angle 41. In one preferred embodiment, first retaining arm 40 is attached to spring pivot portion 20 such that engagement angle 41 is preferably within the range of about 30 to 135 degrees.

When eyeglass retainer 16 is at rest and is not contacting eyeglasses wearer 70, eyeglass retainer 16 is unengaged. When engagement angle 41 of unengaged eyeglass retainer 16 is between 35 and 90 degrees, engagement angle 41 decreases as eyeglass retainer 16 is applied to eyeglasses wearer 70 and first retaining arm 40 and second retaining arm 50 flex towards temple arm 18. Further, when engagement angle 41 of unengaged eyeglass retainer 16 is between 35 and 90 degrees, and eyeglass retainer 16 is applied to eyeglasses wearer 70, first retainer tip 45 and second retainer tip 53 resiliently engage eyeglasses wearer 70 such that forward motion of eyeglass retainer 16 and eyeglass frame 10 increases engagement angle 41 and is resisted by tension created in and between spring pivot portion 20, temple arm 18 and retaining arm 22. Finally, when engagement angle 41 of unengaged eyeglass retainer 16 is between 90 and 135 degrees, spring pivot portion 20 creates a pivot point that is beyond distal end 14 and aids in application of eyeglass frames 10 by allowing flexion of temple arm 18 and retaining arm 22.

Application tip 44 has beveled edge 46 and beveled edge 46 is formed at application angle 48. Application angle 48 ranges from about 20 to 85 degrees. Beveled edge 46 aids the sliding application of eyeglass retainer 16 along eyeglasses wearer's 70 head by providing an obstruction reduced leading edge. In the alternative embodiment shown in FIGS. 4 through 6, projections 32 are angled fins that bend down toward first retaining arm 40 and second retaining arm 50 when eyeglass retainer 16 is being applied to eyeglasses wearer 70, and thus projections 32 do not significantly increase resistance to the application of eyeglass retainer 16 equipped eyeglass frames 10. Once eyeglass retainer 16 is applied to the eyeglasses wearer 70, projections 32 resist bending away from first retaining arm 40 and second retaining arm 50 and thus aid in securing eyeglass retainer 16, and therefore eyeglass frames 10, to eyeglasses wearer 70.

FIG. 7 is a side view of an alternative embodiment of eyeglass retainer 16 and illustrates retaining hooks 55. When eyeglass retainer 20 is in an unengaged position, retaining hooks 55 are angled downward towards spring pivot portion 20, and inward toward the midline of spring pivot portion 20. As eyeglass retainer 16 is pulled forward and first retaining arm 40 and second retaining arm 50 are pulled away from spring pivot portion 20, first retaining arm 40 and second retaining arm 50 spread apart from each other and rotate outward. The outward movement and rotation of first retaining arm 40 and second retaining arm 50 results in retaining hooks 55 achieving an ideal retention angle for increased resilient engagement of eyeglasses wearer 70.

FIG. 8 is a bottom view of an alternative embodiment of eyeglass retainer 16 and illustrates projections 32 as teeth for engaging an eyeglass wearer 70 and further illustrates retaining hook 55. First retaining arm 40 is shaped as a curve which has a concave side closest to temple arm 18. Retaining hook 55 is curved toward temple arm 18 with its concave side closest to temple arm 18. When eyeglass retainer 16 is engaged with eyeglasses wearer 70 and eyeglass frame 10 is moved forward, the inherent spring force in the curved shape of first retaining arm 40 increases resistance to forward movement by requiring first retaining arm 40 to straighten out as eyeglass retainer 16 is pulled forward. Thus, first retaining arm 40 increasingly engages eyeglasses wearer's 70 head. Once first retaining arm 40 is extended beyond an unengaged engagement angle 41 of ninety degrees, retaining hook 55 resiliently engages and captures eyeglasses wearer 70. Retaining hook 55 is curved toward temple arm 18 which further aids in smooth application of eyeglass retainer 16 to eyeglasses wearer 70 because retaining hook's 55 rounded surface creates a reduced drag sliding surface. Second retaining arm 50 is a mirror image of first retaining arm 40 and therefore is not discussed separately.

FIG. 9 shows a section view of an alternative embodiment of temple arm 18 taken along section line 9-9 in FIG. 3. Temple arm 18 has open end 24, pivot end 26, receiving orifice 57, and constricting orifice 62 that all lie approximately along long axis 60. Receiving orifice 57 is concentric to open end 24 and has first center 56 that is located approximately on long axis 60. Receiving orifice 57 has a greater diameter then constricting orifice 62 and constricting orifice 62 is positioned between receiving orifice 57 and pivot end 26 such that tapered wall 66 is attached to constricting orifice 62 and receiving orifice 57 and forms conical chamber 64. The diameter of receiving orifice 57 ranges from about 1/32 of an inch to 1/4 of an inch, and constricting orifice 62 has a diameter less than that of receiving orifice 57. As temple 12 is inserted into conical chamber 64, tapered wall 66 narrows towards constricting orifice 62 such that tapered wall 66 frictionally engages temple 12 and resiliently holds eyeglass retainer 16 on temple 12.

FIGS. 10 and 11 show an alternative embodiment of eyeglass retainer 16 where temple arm 18, spring pivot portion 20 and retaining arm 22 are all part of a single shaft that includes hole 68 through which temple arm 18 is passed and forms spring pivot portion 20. FIG. 10 shows a section view taken along section line 10-10 in FIG. 9 and further illustrates the structure of spring pivot portion 20. Temple arm 18 passes through hole 68 such that spring pivot portion 20 is a loop of shaft that is in a constant state of tension and thus resists relative movement between temple arm 18 and retaining arm 22.

Figure 12:
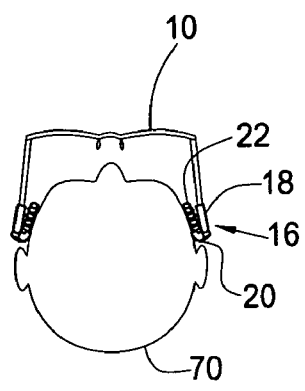
FIG. 12 is a top view of an eyeglasses wearer applying an eyeglass frame equipped with an eyeglass retainer of the present invention.

FIG. 12 is a top view of eyeglasses wearer 70 as eyeglass frame 10 with eyeglass retainer 16 removably attached to temple 12. As illustrated, retaining arm 20 bends towards temple arm 18 such that engagement angle 41 is decreased during application of eyeglasses 10. Beveled edge 46 of application tip 44 enhances slideability of eyeglass retainer 16 along eyeglasses wearer 70 by decreasing drag. First retaining arm 40 allows a downward flex towards temple arm 18 during application of eyeglasses 10 equipped with eyeglasses retainer 16, and facilitates application of eyeglass frame 10. Thus, eyeglass frame 10 with eyeglass retainers 16 are easily applied using either one or two hands where eyeglass frame 10 are brought towards the front of eyeglasses wearer's 70 head, and from the front of eyeglasses wearer's 70 head temples 12 travel over the side of the head of eyeglasses wearer 70 until eyeglass frame 10 engages eyeglasses wearer's 70 nose.

Figure 13:
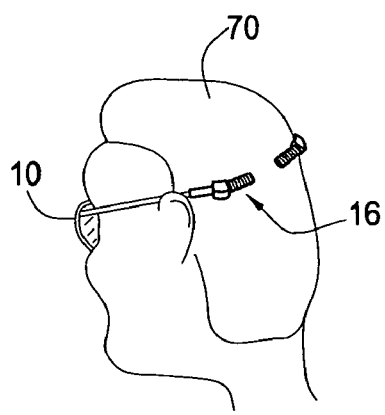
FIG. 13 is a perspective view of an eyeglasses wearer wearing an eyeglass retainer of the present invention.

FIG. 13 is a perspective view of eyeglasses wearer 70 wearing eyeglass frame 10 with eyeglass retainer 16 attached. Eyeglasses wearer 70 is wearing eyeglass frame 10 which are equipped with eyeglass retainer 16. Temple arm 18 is removably attached to temple 12, and exterior surface 30 and projections 32 of retaining arm 22 engage the back of the head of eyeglasses wearer 70 without applying uncomfortable pressure. Spring pivot portion 20 resists relative movement between temple arm 18 and retaining arm 22 such that eyeglass frame 10 is resiliently engaged with eyeglasses wearer 70 and resists slipping and bouncing.

Figure 14:
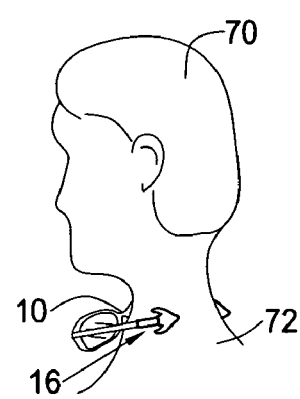
FIG. 14 is a perspective view of an eyeglasses wearer wearing an eyeglass retainer of the present invention in an alternate location.

FIG. 14 is a perspective view of eyeglasses wearer 70 wearing eyeglass frame 10 in an alternative location and with eyeglass retainer 16 attached. Eyeglass frame 10 with eyeglasses retainer 16 removably attached is secured to neck 72 of eyeglasses wearer 70. Again, application of eyeglass frame 10 to neck 72 is made effortless by beveled edge 46 of application tip 44 and by inward flexion of retaining arm 22 towards temple arm 18 as eyeglasses 10 are pushed onto neck 72. Once on neck 72, eyeglass frame 10 is secured by outward extension of retaining arm 22 away from temple arm 18, and exterior surface 30, projections 32 and/or dimples 35, and first retaining tip 45 and second retaining tip 53 engage neck 72 while spring pivot portion 20 resists relative movement between temple arm 18 and retaining arm 22 and prevents dislodgment of eyeglass frame 10 even during rigorous activity. Although FIG. 13 shows eyeglass retainer 16 used to retain eyeglass frame 10 on neck 72 of eyeglasses wearer 70, eyeglass retainer 16 may also be used to secure eyeglass frame 10 on a hat, arm, leg, or back of an eyeglasses wearer's 70 head.

Although the present invention has been described with reference to preferred embodiments, workers skilled in the art will recognize that changes may be made in form and detail without departing from the spirit and scope of the invention.

What is claimed is:

1. An eyeglass retainer for attaching to an eyeglass frame having a temple, the eyeglass retainer comprising;
    a temple arm having an open end and a pivot end, wherein the temple has a distal end and the distal end is removably insertable into the open end;
    a retaining arm having a proximate end and an exterior surface, wherein the exterior surface engages an eyeglasses wearer; and
    a spring pivot portion attached to the pivot end of the temple arm and the proximate end of the retaining arm, wherein the spring pivot portion resists relative movement between the temple arm and the retaining arm thereby retaining the eyeglass frame against the eyeglasses wearer.

2. The eyeglass retainer of claim 1 wherein the retaining arm comprises a pair of elongated shafts, the pair of elongated shafts extending from an—attachment region to a spaced-apart region, wherein the attachment region is located at the proximate end of the retaining arm.

3. The eyeglass retainer of claim 1 wherein the temple arm further comprises;
   a long axis defined through the open end and the pivot end, wherein the open end has a first center and the pivot end has a second center such that the long axis passes through the first center and the second center;
   a conical chamber oriented along the long axis and having a tapered wall, a receiving orifice and a constricting orifice, wherein the receiving orifice has a greater diameter than the constricting orifice and the receiving orifice is concentric to the open end and the constricting orifice is positioned between the receiving orifice and the pivot end.

4. The eyeglass retainer of claim 1 wherein the exterior surface comprises at least one projection for active engagement of the eyeglasses wearer.

5. The eyeglass retainer of claim 1 wherein the exterior surface comprises a plurality of dimples for active engagement of the eyeglasses wearer.

6. The eyeglass retainer of claim 1 wherein the open end comprises a diameter between about $\frac{1}{32}$ of an inch and $\frac{1}{4}$ of an inch.

7. The eyeglass retainer of claim 1 wherein the temple arm and the retaining arm are coupled to the spring pivot portion forming an engagement angle between the temple arm and the retaining arm, the engagement angle ranging from about 30 to 135 degrees.

8. The eyeglass retainer of claim 1 wherein the temple arm, the retaining arm, and the spring pivot portion are made of an elastomeric material.

9. An eyeglass retainer for attaching to an eyeglass frame having a temple, the eyeglass retainer comprising:
   a spring pivot portion;
   a temple arm extending from the spring pivot portion, the temple arm having a pivot end and an open end, wherein the pivot end is attached to the spring pivot portion, whereby the temple has a distal end and the distal end is removably insertable into the open end;
   a first retaining arm extending from the spring pivot portion and forming an engagement angle with the temple arm, the engagement angle ranging from about 30 to 135 degrees, the first retaining arm having a first exterior surface and a first retaining tip for resiliently engaging an eyeglasses wearer, whereby the engagement angle is decreased as the eyeglass frame is applied to the eyeglasses wearer and the spring pivot portion resists relative movement between the temple arm and the first retaining arm thereby retaining the eyeglass frame against the eyeglasses wearer.

10. The eyeglass retainer of claim 9, further comprising:
   a second retaining arm extending from the spring pivot portion, the second retaining arm being substantially aligned with the engagement angle, the first retaining arm and the second retaining arm extending from an attachment region to a spaced-apart region, wherein the attachment region is located at the spring pivot portion; and
   a second exterior surface and a second retaining tip, the second exterior surface and the second retaining tip for resiliently engaging the eyeglasses wearer.

11. The eyeglass retainer of claim 10, wherein the spring pivot portion further comprises an application tip opposite the temple arm, the application tip having a beveled edge and the beveled edge having an application angle, the application angle ranging from about 20 to 85 degrees.

12. The eyeglass retainer of claim 9, wherein the spring pivot portion further comprises an application tip, the application tip extending opposite the open end of the temple arm.

13. The eyeglass retainer of claim 12, wherein the application tip includes a beveled edge having an application angle, the application angle ranging from about 20 to 85 degrees, whereby the application tip increases slideability of the eyeglass retainer along the eyeglasses wearer during application of the eyeglass frame.

14. The eyeglass retainer of claim 9, wherein the first retaining arm is shaped as a curve with a concave side closest to the temple arm, and comprises a retaining hook, wherein the retaining hook is curved downward and inward towards the spring pivot portion for resiliently engaging the eyeglasses wearer.

15. The eyeglass retainer of claim 9 wherein the temple arm further comprises;
   a long axis defined through the open end and the pivot end, wherein the open end has a first center and the pivot end has a second center such that the long axis passes through the first center and the second center; and
   a conical chamber oriented along the long axis and having a tapered wall, a receiving orifice and a constricting orifice, wherein the receiving orifice has a greater diameter than the constricting orifice and the receiving orifice is concentric to the open end and the constricting orifice is positioned between the receiving orifice and the pivot end.

16. The eyeglass retainer of claim 9 wherein the first exterior surface comprises at least one projection for active engagement of the eyeglasses wearer.

17. The eyeglass retainer of claim 9 wherein the first exterior surface comprises a plurality of dimples for active engagement of the eyeglasses wearer.

18. The eyeglass retainer of claim 9 wherein the open end comprises a diameter between about $\frac{1}{32}$ of an inch and $\frac{1}{4}$ of an inch.

19. The eyeglass retainer of claim 9 wherein the temple arm, the first retaining arm, and the spring pivot portion are made of an elastomeric material.

20. An eyeglass retainer for attaching to an eyeglass frame having a temple, the eyeglass retainer comprising:
   a temple arm having an elongated tubular shaft, a hollow core, a pivot end and an open end, wherein the temple is removably insertable into the open end;
   a retaining arm comprising;
      a proximate end; and
      an elongated cylindrical shaft having an exterior surface, wherein the exterior surface engages an eyeglasses wearer;
   a spring pivot portion comprising;
      a hole located medially between the temple arm and retaining arm; and
      a spring loop formed by the insertion of the open end through the hole, wherein the spring loop pivotally couples the pivot end and the proximate end;
   wherein the spring pivot portion resists relative movement between the temple arm and the retaining arm thereby retaining the eyeglasses frame against the eyeglasses wearer.

* * * * *